(12) United States Patent
Polka et al.

(10) Patent No.: US 12,420,584 B2
(45) Date of Patent: Sep. 23, 2025

(54) FLOATING CENTERCAP FOR VEHICLE

(71) Applicant: REALWHEELS CORPORATION, Zion, IL (US)

(72) Inventors: John G. Polka, Green Oaks, IL (US); Ron Tushner, Spring Grove, IL (US)

(73) Assignee: REALWHEELS CORPORATION, Zion, IL (US)

( * ) Notice: Subject to any disclaimer, the term of this patent is extended or adjusted under 35 U.S.C. 154(b) by 423 days.

(21) Appl. No.: 17/963,685

(22) Filed: Oct. 11, 2022

(65) Prior Publication Data

US 2023/0116450 A1 Apr. 13, 2023

Related U.S. Application Data

(60) Provisional application No. 63/253,765, filed on Oct. 8, 2021.

(51) Int. Cl.
| | | |
|---|---|---|
| *B60B 7/20* | (2006.01) | |
| *B60B 7/00* | (2006.01) | |
| *B60B 7/06* | (2006.01) | |
| *B60B 7/14* | (2006.01) | |

(52) U.S. Cl.
CPC .............. *B60B 7/20* (2013.01); *B60B 7/0013* (2013.01); *B60B 7/066* (2013.01); *B60B 7/14* (2013.01)

(58) Field of Classification Search
CPC ....... B60B 7/20; B60B 7/0013; B60B 7/0066; B60B 7/14
See application file for complete search history.

(56) References Cited

U.S. PATENT DOCUMENTS

| | | | |
|---|---|---|---|
| 710,195 A | 9/1902 | Jones | |
| 2,014,058 A | 9/1935 | Tonai | |
| 2,169,237 A | 8/1939 | Gasco | |
| 2,548,070 A | 4/1951 | Ryan | |
| 2,869,262 A | 1/1959 | Lucas | |
| 4,678,239 A | 7/1987 | Matsushita | |
| 4,961,611 A * | 10/1990 | Patti | B60B 7/14 |
| | | | 301/37.38 |
| 5,286,092 A * | 2/1994 | Maxwell, Jr. | B60B 7/0013 |
| | | | 301/108.4 |
| 2012/0319459 A1* | 12/2012 | Salah | B60B 7/20 |
| | | | 301/37.25 |
| 2013/0015698 A1* | 1/2013 | Butler | B60B 7/066 |
| | | | 301/37.29 |
| 2015/0170558 A1* | 6/2015 | Salah | B60B 7/0053 |
| | | | 301/5.22 |
| 2016/0052336 A1 | 2/2016 | Bazerkanian | |
| 2018/0272412 A1* | 9/2018 | Bazerkanian | B60B 7/14 |
| 2023/0078032 A1* | 3/2023 | Lee | B60B 7/0013 |
| | | | 301/37.101 |

FOREIGN PATENT DOCUMENTS

DE 102016214881 A1 * 2/2018

OTHER PUBLICATIONS

English translation of DE 102016214881 A1.*

* cited by examiner

*Primary Examiner* — S. Joseph Morano
*Assistant Examiner* — Alex Palmer
(74) *Attorney, Agent, or Firm* — Pauley Erickson & Swanson

(57) ABSTRACT

A floating centercap assembly for a vehicle includes a cap and a counterweight affixed to the cap. A cup is included having a central bearing affixed to the cap wherein the counterweight travels rotationally within a sidewall of the cup. One of a retainer clip and a bracket affixes the cup to the vehicle wheel cover or axle.

17 Claims, 6 Drawing Sheets

A floating centercap assembly comprising:

FLOATING CENTERCAP FOR VEHICLE

CROSS REFERENCE TO RELATED APPLICATION

This application claims the benefit of U.S. Provisional Application Ser. No. 63/253,765, filed on 8 Oct. 2021. The provisional application is hereby incorporated by reference herein in its entirety and is made a part hereof, including but not limited to those portions which specifically appear hereinafter.

BACKGROUND OF THE INVENTION

Field of the Invention

The present invention relates generally to a floating badge or marque for placement in a wheel cover or axle cover centercap of a roadway vehicle such as a truck.

Description of Prior Art

Vehicle manufacturers tend to include badging on their vehicles for identification and mass marketing of their brands and marques. However, branding on wheels is difficult because of rotation of the wheel obscures the branding thereon.

Attempts have been made to affix floating branding in vehicle wheels. Such attempts have not translated to trucks and more heavy duty, heavy use vehicles because such vehicles are often not compatible with conventional wheels and more prone to dirt and similar damage contamination.

A need therefore exists to place branding on vehicles, particularly large scale commercial and municipal such as trucks and fire engines, in a manner that permits visibility of the branding even while the vehicle is in motion.

SUMMARY OF THE INVENTION

An object of the present invention is to provide a "floating" centercap in a vehicle wheel cover to maintain legibility of a brand or marque while the vehicle is in motion.

A general object of the invention can be attained, at least in part, through a floating centercap assembly that includes a cap, a counterweight, one or more bearings, a cup and a retainer clip or bracket that together form one embodiment of the subject invention.

Other objects and advantages will be apparent to those skilled in the art from the following detailed description taken in conjunction with the appended claims and drawings.

DESCRIPTION OF PREFERRED EMBODIMENTS

Figure 1A:
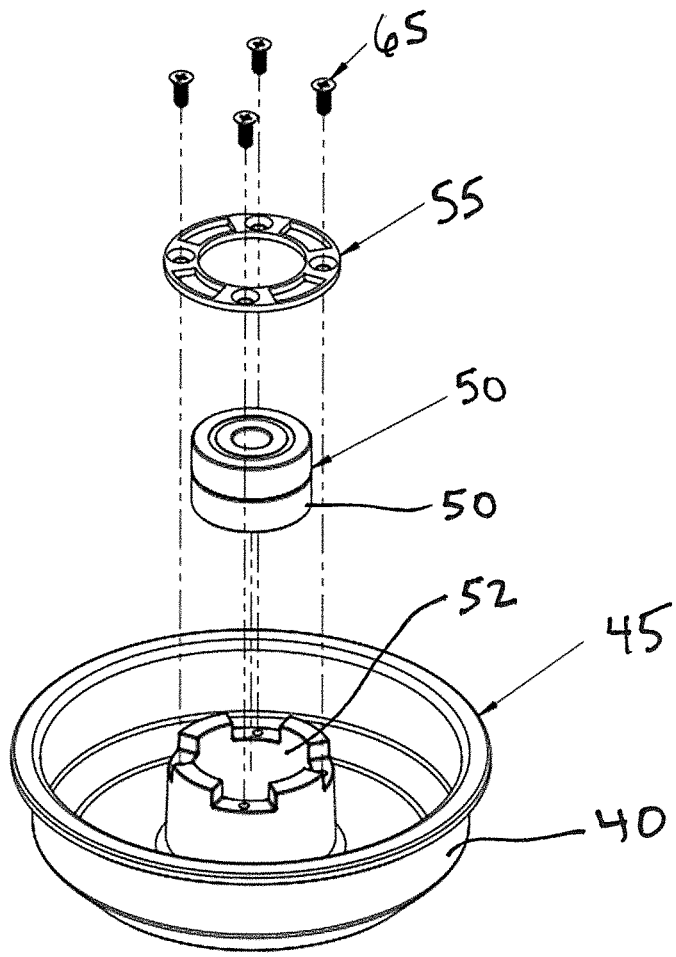
FIG. 1A shows a front perspective exploded view of a portion of a floating centercap assembly according to one embodiment.
Figure 1B:
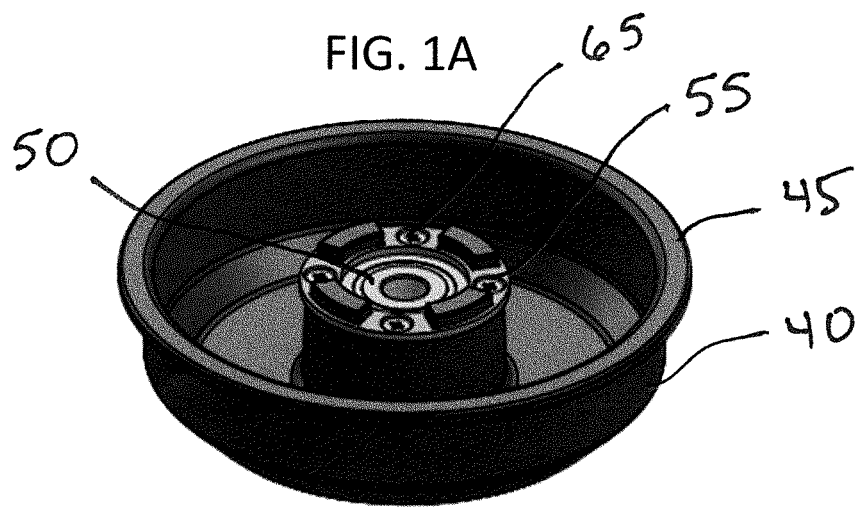
FIG. 1B shows a perspective view of the portion of the floating centercap assembly shown in FIG. 1A.
Figure 2:
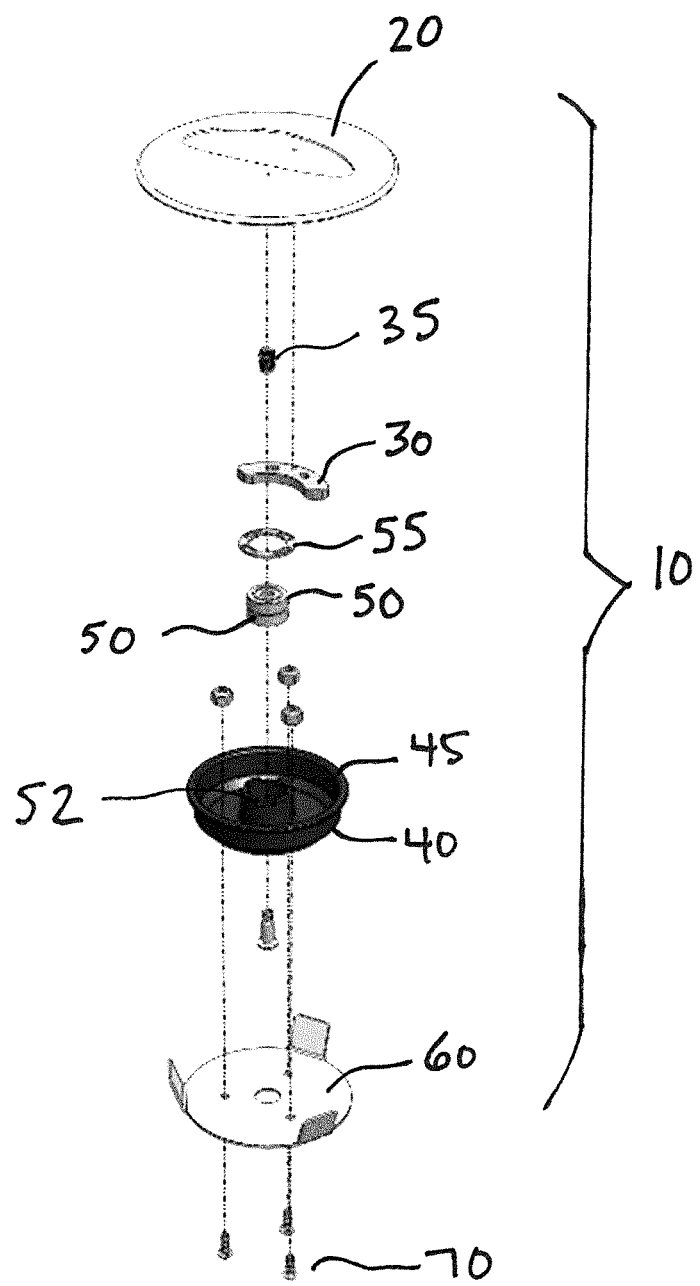
FIG. 2 shows a front perspective exploded view of a floating centercap assembly according to one embodiment.
Figure 3:
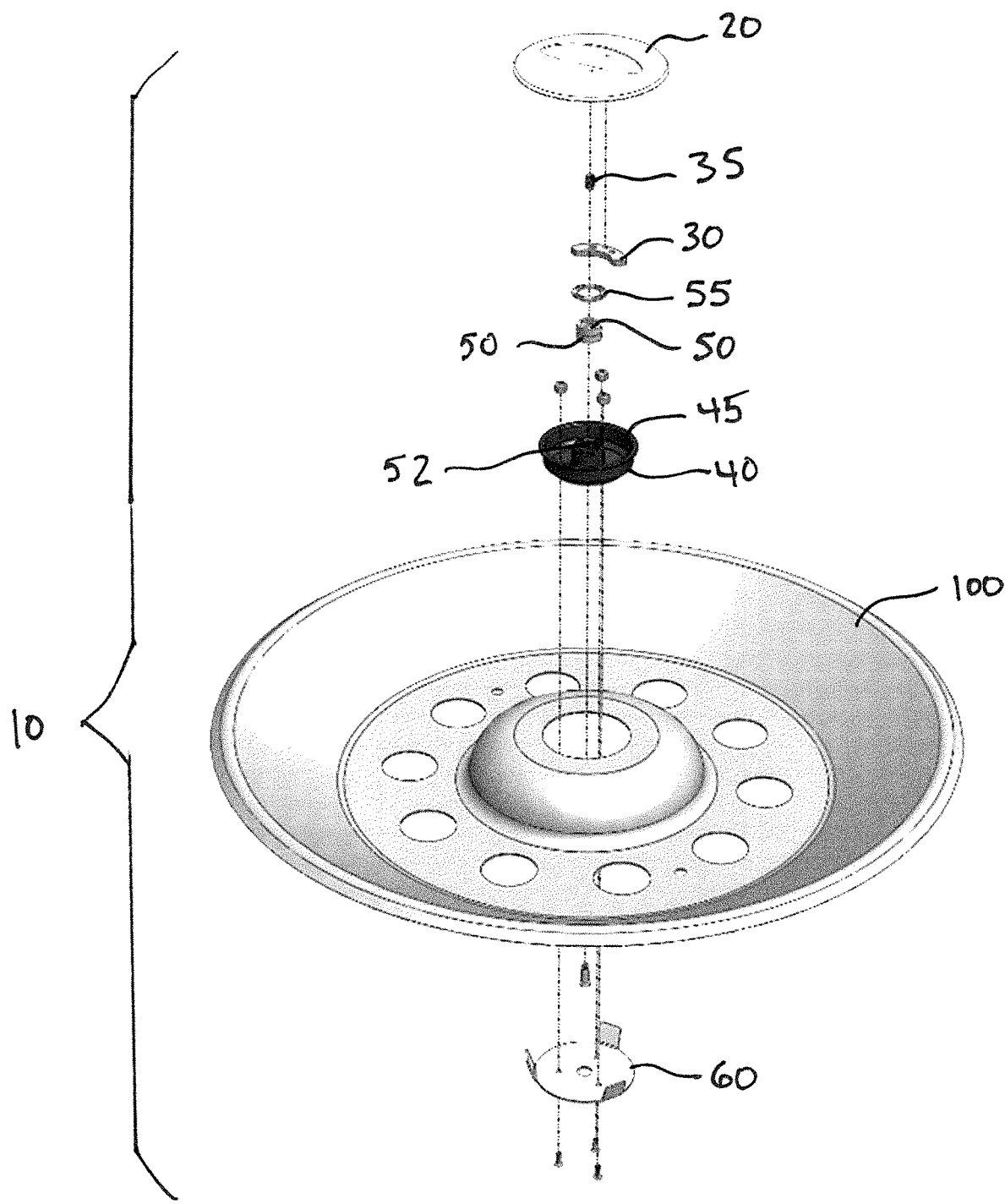
FIG. 3 shows a front perspective exploded view of a floating centercap assembly including a wheel cover according to one embodiment.
Figure 4:
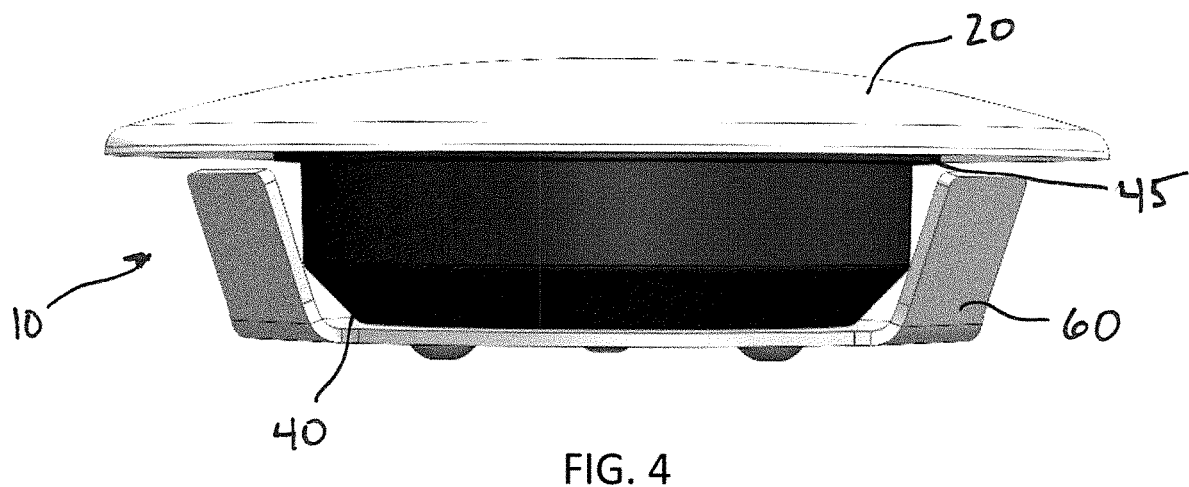
FIG. 4 shows a side view of a floating centercap assembly according to FIG. 2.
Figure 5:
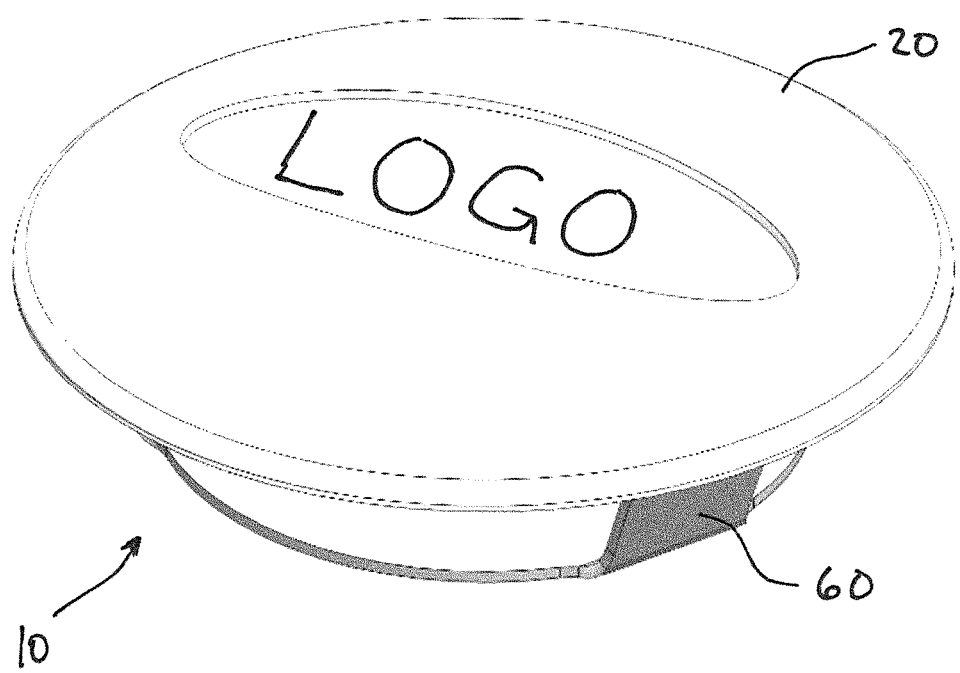
FIG. 5 shows a perspective top view of a floating centercap assembly according to FIG. 2.
Figure 6:
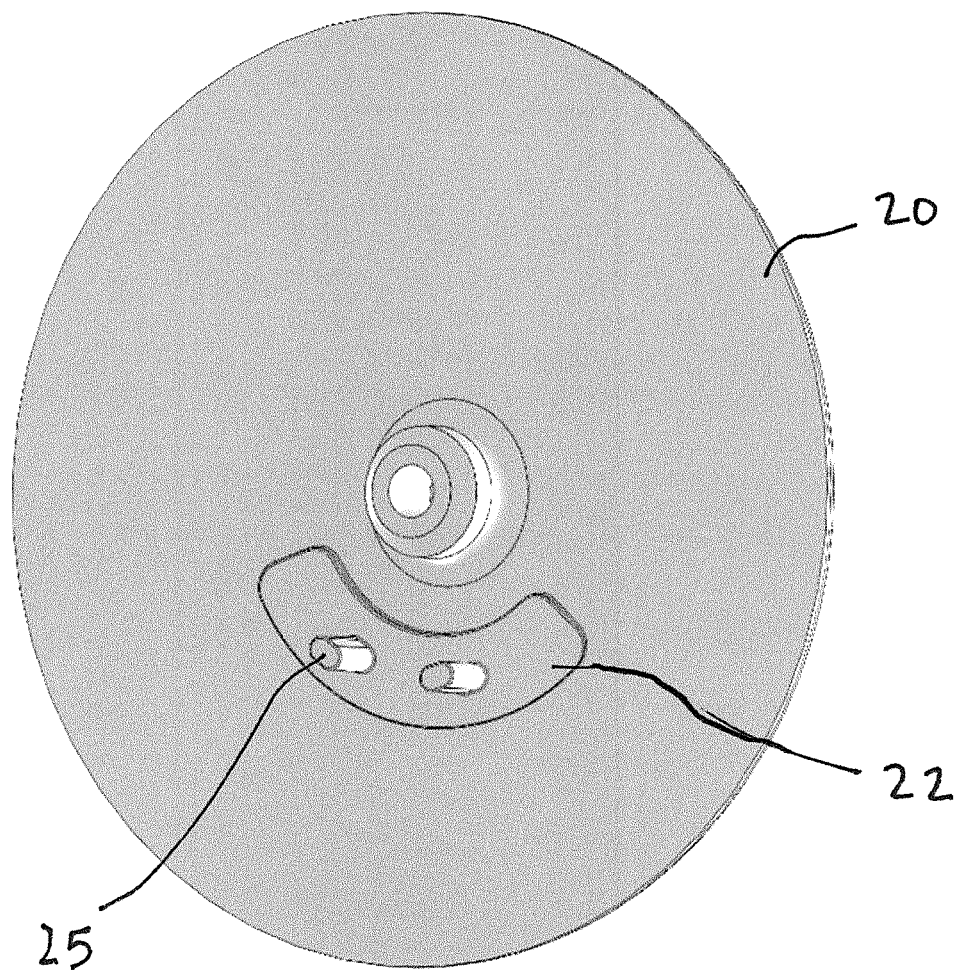
FIG. 6 shows a bottom view of a cap according to one embodiment.
Figure 7:
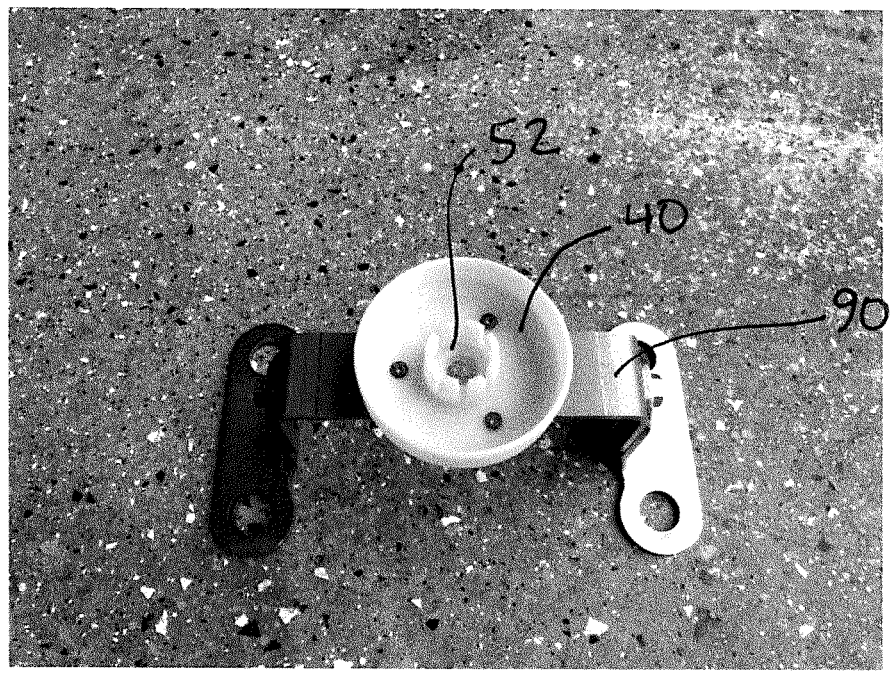
FIG. 7 shows a top view of a cup for assembly with a vehicle axle according to one embodiment.
Figure 8:
FIG. 8 shows a side view of an assembly installed on a vehicle axle.

Embodiments of the subject invention include the assemblies shown in FIGS. 1-8. FIG. 1A shows an exploded view of a portion of a standalone assembly and FIG. 1B shows the portion in assembled form. FIGS. 2 and 3 show an exploded view of a standalone assembly used in connection with a wheel cover shows as assembled on a wheel cover and assembled in FIGS. 4 and 5. FIGS. 7 and 8 show embodiments that may be attached relative to an axle assembly on some vehicles, such as trucks.

FIGS. 1A and 1B show a portion of a floating centercap assembly 10 that includes a cap 20, a counterweight 30, one or more bearings 50, a bearing retainer 55, and a cup 40 that together form one embodiment of the subject invention. Likewise, FIG. 2 shows an assembly that includes a retainer clip 60 and FIG. 3 shows a generally complete embodiment further showing a wheel cover 100.

As shown in FIGS. 1-3, the cap 20, at one end of the floating centercap assembly 10, is preferably a decorative cap that may include central branding such as an automotive logo or other trademark, slogan, graphic or other visual that may be desirable for placement in connection with the vehicle. As best shown in FIG. 5, the cap 20 may include an outward facing side with a recess or similar perimeter for placement of a decal, screenprinted or embossed logo or other similar visual cue. As shown in FIG. 6, an inward side of the cap 20 preferably includes two or more posts 25 and a raised or recessed land 22.

The counterweight 30 is preferably affixed to the inward side of the cap 20. The counterweight 30 is preferably constructed of a heavy material such as steel or lead, preferably a material heavier than the cap 20 material. The counterweight 30 may further comprise a generally arcuate segment, preferably having an arc of less than 180 degrees and more preferably less than or equal to 120 degrees. As shown in the drawings, the counterweight 30 is preferably positioned on or embedded in a land 22 within the cap 20. The counterweight 30 may alternatively or additionally include apertures through which the two or more posts 25 of the cap 20 may extend to fix the counterweight into position relative to the cap 20. The posts 25 may then be fastened, melted or otherwise attached to the counterweight 30 thereby adhering the counterweight 30 to the cap 20.

As shown in FIGS. 1-3, the cup 40 includes at least one central bearing 50 affixed to the cap 20 wherein the counterweight 30 travels rotationally within the confines of the cup 40. The confines of the cup are preferably defined by a circular peripheral sidewall. The bearing(s) 50 may be attached to the cap 20 using an anchor 35 or similar hardware connecting the bearing 50 to the cap 20. For this purpose, the cup 40 preferably includes a central bearing sleeve 52 to accommodate one or more bearings 50. The central bearing sleeve 52 may be crenellated along a top surface, as best shown in FIG. 1A.

In addition, the cup 40 may include an outwardly extending flange 45 around a periphery of the sidewall of the cup 40. In an assembled state, the flange 45 of the cup 40 is preferably slightly spaced from the inward surface of the cap 20 to enable the cap 20 to freely rotate relative to the cup 40. Likewise, the counterweight 30 is slightly spaced from the sidewall of the cup 40 to permit free rotation therein.

The bearing retainer 55 is thus positioned on the bearing sleeve 52 to retain the central bearing(s) 50 in position. As best shown in 1A and 1B, the bearing retainer 55 may include apertures that mate with corresponding crenellations of the bearing sleeve 52. The bearing retainer 55 is thus rotationally fixed into place by the mating of the crenellations and apertures and may be further laterally fixed to the bearing sleeve 52 with a plurality of retention screws 65.

In one preferred embodiment, two central bearings 50 are positioned in the bearing sleeve 52 of the cup 40 in a stacked arrangement. The bearings 50 are preferably sealed ball bearings that encourage the free rotation of the cap 20 relative to the cup 40.

As shown in FIGS. 2-5, a retainer clip 60 may be arranged to fix the assembly 10 relative to a wheel cover 100. In this arrangement, the wheel cover 100 is preferably sandwiched between the retainer clip 60 and the cup 40. The retainer clip 60 is preferably fashioned of spring steel or similar material to permit some flexibility when making the assembly.

Alternatively, a bracket 90 maybe arranged to fix the assembly 10 relative to an axle of a vehicle. As shown, the bracket 90 may be attached directly to the axle of the vehicle using lug bolts or similar hardware already in place on the axle. The bracket 90 is preferably adjustable to permit attachment to a wide variation of axle covers. In either arrangement, wheel cover or axle, the assembly 10 may be freely removable and replaceable among the various wheel covers or axles of a vehicle or between vehicles.

Specifically, a retainer clip 60 is positioned on one side of a wheel or wheel cover 100. The cup 40 is positioned on an opposite side and is fixed into place along a flange 45 that engages with an opening of the wheel cover 100. The cup 40 includes a volume defined by the sidewall and the central bearing sleeve 52.

One or more bearings 50 are positioned within the bearing sleeve 52 and covered with a bearing retainer 55. The cap 20 is then affixed to the bearings 50 such as with the anchor 35. The cap 20 includes a counterweight 30 that can travel within the volume of the cup 40. As shown, a preferred embodiment of the counterweight 30 includes a generally curved body that corresponds with a curve of the cup 40. In this way, the counterweight 30 can travel within the cup 40 until it finds a center of gravity at a lower end of the cup 40. In this manner, the cap 20 is maintained in a desired position.

The cap 20 may include a label or printing on an outer side that is appropriate for the vehicle or wheels on the vehicle. One example would be a marque of the vehicle or model of the vehicle which is then maintained in a non-moving legible fashion even while the vehicle is in motion.

Embodiments of the subject invention can be applied to all wheel covers and axles on a variety of vehicles. As used herein, the centercap assembly is preferably used in connection with a wheel cover or an axle cover that mount to the front or rear wheels of commercial trucks, fire trucks, motor homes, etc. The assembly preferably stays with the wheel cover it is attached to and not the actual wheel of the vehicle. However, the subject invention may alternatively be adapted directly to a vehicle wheel.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

The invention claimed is:

1. A floating centercap assembly for a vehicle wheel cover, the floating centercap assembly comprising:
    a cap;
    a counterweight affixed to the cap;
    a cup having a central bearing affixed to the cap wherein the counterweight travels rotationally within the cup, wherein the cup includes a central bearing sleeve and a perimeter sidewall, wherein the central bearing sleeve is crenellated;
    a bearing retainer positioned on the bearing sleeve to retain the central bearing, wherein the bearing retainer includes apertures that mate with corresponding crenellations of the bearing sleeve; and
    one of a retainer clip and a bracket affixing the cup to the vehicle wheel cover or axle.

2. The floating centercap assembly of claim 1 wherein the bearing retainer is affixed to the bearing sleeve with a plurality of retention screws.

3. The floating centercap assembly of claim 1 comprising two central bearings, the two central bearings stacked on top of each other.

4. The floating centercap assembly of claim 1 wherein the counterweight comprises an arcuate segment having an arc of less than 120 degrees.

5. The floating centercap assembly of claim 1 wherein the cap includes two or more posts which are engaged with the counterweight.

6. The floating centercap assembly of claim 1 wherein the bracket is attached directly to the axle of a vehicle.

7. The floating centercap assembly of claim 1 wherein the cup includes a flange around a periphery of the cup.

8. The floating centercap assembly of claim 7 wherein the flange is spaced from a bottom surface of the cap.

9. The floating centercap assembly of claim 1 wherein the wheelcover is sandwiched between the retainer clip and the cup.

10. The floating centercap assembly of claim 1 wherein the counterweight is embedded in a land within the cap.

11. The floating centercap assembly of claim 1 further comprising an anchor connecting the bearing to the cap.

12. A floating centercap assembly for a vehicle wheel cover, the floating centercap assembly comprising:
    a cap;
    a counterweight affixed to the cap;
    a cup including a central bearing sleeve and a perimeter sidewall;
    a pair of bearings stacked within the central bearing sleeve and connected to the cap to permit the counterweight to travel rotationally within the cup;
    a bearing retainer positioned on the bearing sleeve to retain the bearings within the bearing sleeve, wherein the bearing sleeve and the bearing retainer mate with crenellations and apertures between them; and
    one of a retainer clip and a bracket affixing the cup to the vehicle wheel cover or axle.

13. A floating centercap assembly for a vehicle comprising:
    a cap;
    a counterweight affixed to the cap;
    a cup having a central bearing affixed to the cap wherein the counterweight travels rotationally within the cup; and a bracket affixing the cup to a vehicle axle, wherein the bracket is attached directly to an axle of the vehicle.

14. The floating centercap assembly of claim 13 wherein the cup includes a central bearing sleeve and a perimeter sidewall.

15. The floating centercap assembly of claim 14 wherein the central bearing sleeve is crenellated.

16. The floating centercap assembly of claim 15 further comprising a bearing retainer positioned on the bearing sleeve to retain the central bearing.

17. The floating centercap assembly of claim 16 wherein the bearing retainer includes apertures that mate with corresponding crenellations of the bearing sleeve.

* * * * *